Patented June 14, 1938

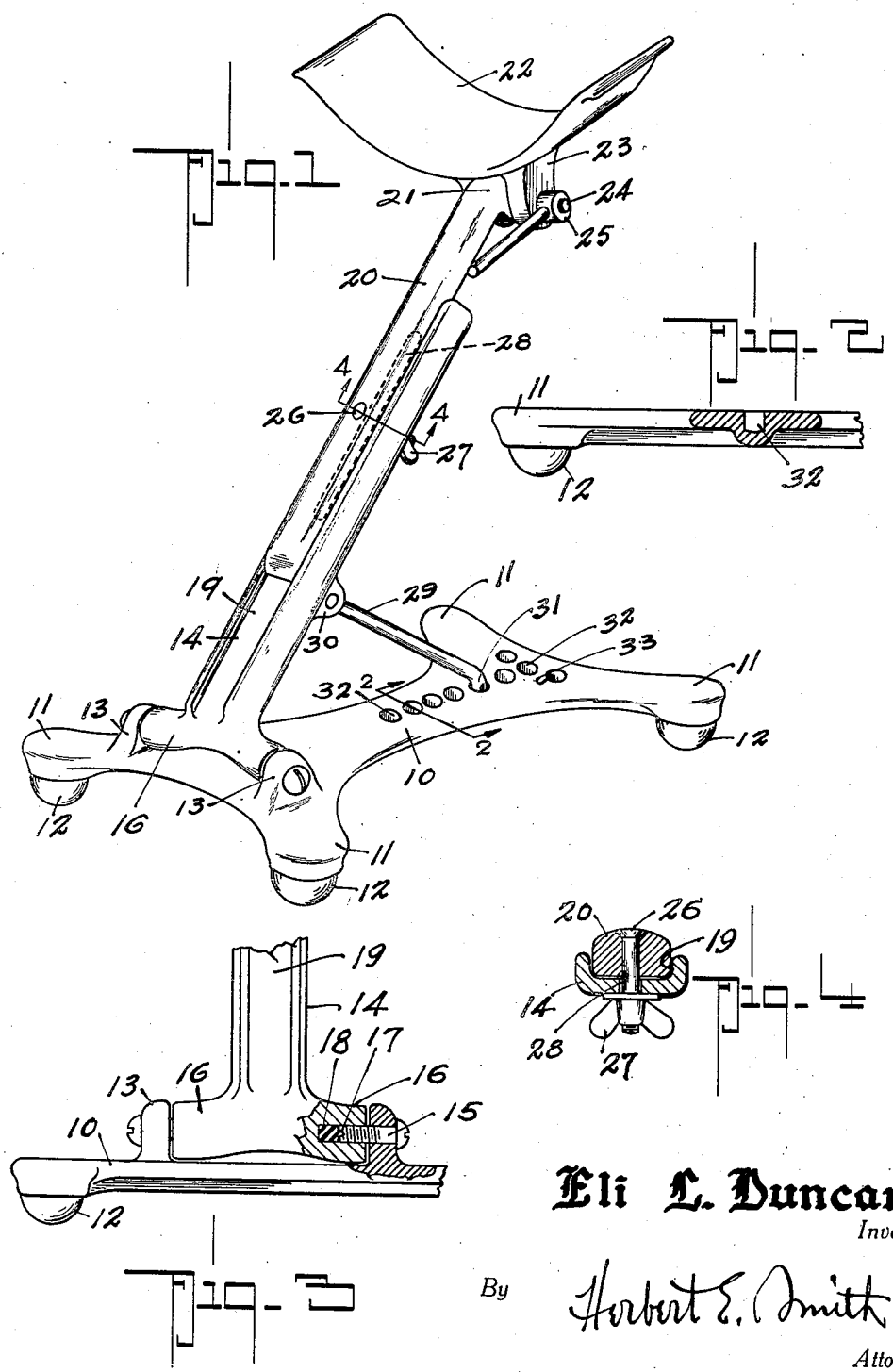

2,120,310

UNITED STATES PATENT OFFICE 2,120,310

ADJUSTABLE HEADREST

Eli L. Duncan, Spokane, Wash.

Application April 15, 1935, Serial No. 16,402

1 Claim. (Cl. 27—13)

My invention relates to adjustable head rests for supporting the head of a corpse during the preparation period and previous to burial.

An important object of the invention is to provide an adjustable headrest, light and simple in construction, having a wide variety of adjustments to render it capable of a wide range of use.

A further object of the invention is to provide an extensible arm for supporting the headrest that will provide for many of the necessary adjustments without requiring adjustments of other portions of the apparatus.

Other objects and advantages of the invention will be apparent during the course of the following description.

In the accompanying drawing, forming a part of this specification and in which like numerals are employed to designate like parts throughout the same, Figure 1 is a perspective view of the adjustable headrest of my invention.

Figure 2 is a fragmentary portion of the base with a portion thereof in cross section and taken on lines 2—2 of Figure 1.

Figure 3 is a fragmentary portion of the base and of the lower portion of the adjustable arm, each being partially in cross section to indicate the pivot arrangement.

Figure 4 is a cross section taken on the lines 4—4 of Figure 1.

The primary principle of my invention consists briefly in an adjustable headrest having a base support, a pivoted and extensible arm provided with a brace or prop support having various adjustments in connection with the base for elevating the arm to a desired position, and of a headrest mounted upon the extensible arm and adjustable in itself to fit the various needs required in its employment.

In the drawing wherein for the purpose of illustration is shown a preferred embodiment of my invention, the numeral 10 designates a base support having a central body portion and legs 11 extending therefrom, each provided with friction buttons 12 upon their lower faces to support the base and provide a friction contact with the table or other supporting medium to prevent too free sliding of the base when in use.

On one end of the base is provided a pair of upright pivot ears 13 spaced apart and aligned to receive and support a pivot arm 14 through the agency of pins or screws 15 which are secured into extension lugs or horns 16 of the arm; and to provide a secure pivot the horns are provided with aligned, threaded bores 17. The threaded pivot pin 15 is notched in its end and a rubber or composition plug 18 is inserted into the extreme end of the bore 17 to contact with the end of the pin or screw pivot 15 to insure against retraction during use.

The extension arm 14 is provided on its upper face with a longitudinal groove 19 for the purpose of receiving the extensible arm 20 which is fitted to and is formed with faces complementary to this groove. The arm 20 is provided with an eye or head 21 and is bored to support a headrest 22. This headrest is formed of an arcuate head support with downwardly extending attachment lugs 23 spaced to pass over the eye or head 21 and be secured thereto by a bolt 24 which may serve as a clamping means through the agency of a nut 25 so that the headrest may be adjusted quickly and easily in any required position.

The members forming the extensible support, consisting of the pivoted arm 14 and the extension member 20, are held in adjusted relation through the agency of a bolt 26 and thumb screw 27 cooperating therewith and which pass through a slot 28 in the pivotal arm 14 to provide for the necessary adjustment through the sliding of the arm in the direction required. The pivot arm 14 is also provided for angular adjustment by means of a brace arm 29 pivotally supported between a pair of ears 30 on the underside of the brace. This brace is formed with a downturned end 31 engaging in any one of a series of aligned holes 32 bored longitudinally of the base 10 and of a pair of auxiliary holes 33 slightly offset to insure at this point of an intermediate adjustment often required in the fullest use of the device.

The brace or prop arm 29 may be withdrawn from any of the holes used for adjusting the pivotal arm and then may be compactly folded upon itself for transportation or for putting away when not in use.

In the construction of the device of my invention I have provided for essential needs in the art which involve the use of a substantially wide-spreading base member of light construction with the legs spaced to properly support the headrest proper in its use and under the various required adjustments.

I have provided a pivotal headrest supporting member which is extensible and adaptable for a wide range of use and which may be quickly and easily adjusted to meet all requirements.

Having thus fully described my invention, what

I claim as new and desire to secure by Letters Patent is:—

In a headrest, the combination of an angularly adjustable horizontally pivoted arm having a longitudinal slot, laterally spaced flanges extending alongside said slot and forming a face-groove, a slidable arm mounted in said groove and terminating in a backwardly-turned perforated-head, a clamp-bolt mounted in the arm and passed through the groove and a clamp-nut for the bolt, a head-supporting member having a pair of perforated ears straddling the head, a horizontally extending pivot-bolt passed through said head and ears, and a clamp nut on said pivot-bolt.

ELI L. DUNCAN.